Figure 1:
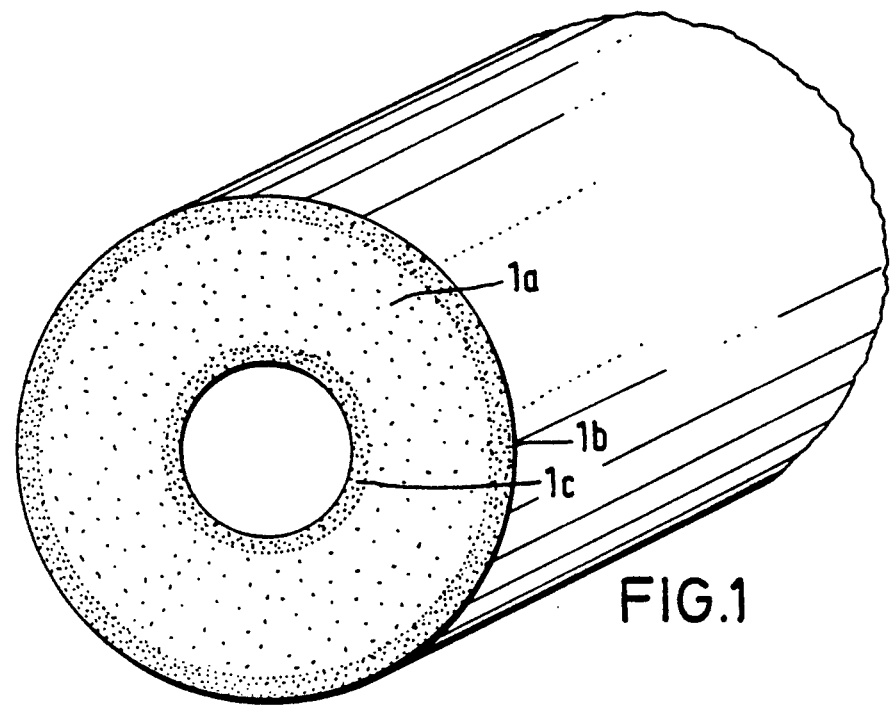

United States Patent [19]
Giesemann

[11] Patent Number: 5,298,068
[45] Date of Patent: Mar. 29, 1994

[54] INORGANIC FOAM BODY AND PROCESS FOR PRODUCING SAME

[76] Inventor: Herbert Giesemann, Rheinalde 5, D-7891 Hohentengen, Fed. Rep. of Germany

[21] Appl. No.: 911,390

[22] Filed: Jul. 13, 1992

Related U.S. Application Data

[63] Continuation of Ser. No. 552,176, Jul. 13, 1990, abandoned.

[30] Foreign Application Priority Data

Jul. 14, 1989 [DE] Fed. Rep. of Germany ....... 3923284

[51] Int. Cl.$^5$ ............................................. C04B 38/00
[52] U.S. Cl. .................................. 106/604; 106/601; 106/605; 106/692; 501/81; 501/84; 501/127; 501/128; 501/99; 501/133
[58] Field of Search ............ 501/84, 81, 80, 99, 501/127, 128, 133, 94; 106/605, 601, 604, 692

[56] References Cited

U.S. PATENT DOCUMENTS

| | | | |
|---|---|---|---|
| 3,827,869 | 8/1974 | Wulf von Bonin | 106/602 |
| 4,405,682 | 9/1983 | Fujita et al. | 428/317.7 |
| 4,798,758 | 1/1989 | Nagano et al. | 428/319.1 |

FOREIGN PATENT DOCUMENTS

| | | |
|---|---|---|
| 0288071 | 10/1988 | European Pat. Off. |
| 1471005 | 11/1968 | Fed. Rep. of Germany |
| 1964000 | 12/1969 | Fed. Rep. of Germany |
| 1965008 | 7/1970 | Fed. Rep. of Germany |
| 3010924 | 10/1981 | Fed. Rep. of Germany |
| 1184864 | 3/1970 | United Kingdom ............ 501/84 |

OTHER PUBLICATIONS

Kosmatka, Steven H. et al., *Design and Control of Concrete Mixtures* 1988 pp. 53–56.

*Primary Examiner*—Mark L. Bell
*Assistant Examiner*—Paul Marcantoni
*Attorney, Agent, or Firm*—Wegner, Cantor, Mueller & Player

[57] ABSTRACT

The inorganic foam body consists of an at least partially open-cell foam formed by thermally foaming and hardening a mixture comprising an alkali water glass and a filler from the group of aluminum oxide, silicon dioxide, aluminous cement, crushed rocks, graphite or mixtures thereof. It is produced by heating a mixture comprising an alkali water glass and a filler from the group of aluminum oxide, silicon dioxide, aluminous cement, crushed rocks, graphite with a blowing agent, and preferably azodicarbonamide, at temperatures of at least 180° C., and preferably of from 200° C. to 300° C. The foam body has a bulk density within the range of from 50 to 500 kg/m$^3$, and preferably of from 50 to 400 kg/m$^3$.

9 Claims, 3 Drawing Sheets

INORGANIC FOAM BODY AND PROCESS FOR PRODUCING SAME

This application is a continuation of U.S. application Ser. No. 07/552,176 filed Jul. 13, 1990, now abandoned.

The present invention relates to inorganic foam bodies which at least in part comprise open cells and preferably have been produced from a mixture which is capable of setting and a foam-forming agent. They are above all suitable as fiber-free highly fire-proof thermally insulating materials which in a so far unknown manner combine highest heat insulation property and retention of shape for the longest possible time at the highest fire temperatures.

All organic insulating foam materials, although they have very good insulation values, dissolve under temperature stress between 100° C. and 200° C. with dripping or melting off formation of fumes and in part with the release of toxic gases.

The German application DE-B-11 54 752 describes a process for the manufacture of vitreous porous shaped bodies. Therein, the vitreous porous shaped bodies are produced by providing that the fibrous silicatic material is digested and dissolved with alkali silicates in a ratio of from 0.02 to 0.7/1 in an aqueous suspension, and the resulting product is dried, comminuted and heated at temperatures of from 700° C. to 900° C. The shaped body preferably can be coated with conventional coating compositions in the liquid form. Furthermore, metal nets or reinforcing sheets may be incorporated in the porous body for increasing the stability thereof.

The German application DE-B-Il 98 271 describes a process for increasing the fire-resistance and resistance to heat of building plates, wherein suspensions of water-containing alkali silicate particles are mixed with finely distributed materials suitable to convert the alkali silicates into water-insoluble silicates at higher temperatures and the resulting suspension is applied onto the surfaces of the building plates. Then, sheets of plastics or metal foils may be laminated onto the dried alkali silicate layers.

The German application DE-B-14 71 005 also describes fiber-containing fire protection boards made of alkali silicates which boards may have been provided with protective coatings against the influence of water.

The German application DE-A-17 96 260 describes a foamable ceramic composition comprising ceramic raw materials, water glass and a nitrogen-based organic bubble-forming active substance which has a decomposition temperature of from 100° C. to 250° C. As the active substance there is mentioned, inter alia, azodicarbonamide. The volume structure of the foamed ceramics comprises an open or half-closed cell structure with a bulk density of from 0.6 to 1.0 kg/l.

The DE-B-19 34 855 also describes a process for the production of a foamed ceramic product based on water glass and blowing agents, where a bulk density of 0.5 kg/l is obtained by the use of an inorganic blowing agent.

Inorganic insulating materials, in contrast to organic insulating foam materials, although they remain dimensionally stable within temperature ranges of from 250° C. to 1100° C., nevertheless constitute an unsatisfactory compromise between an insulation as high as possible and the retention of shape (dimensional stability) as required between 750° C. and 1200° C. Although the glass and mineral fiber insulating materials have low values of heat conductivity, in case of a fire they will only resist up to 750 ° C. A further disadvantage is that said materials, due to the sensitive fibrous structure thereof, already within said range are not able to withstand a fire-extinguishing high-pressure water-jet of 2 bar (DIN 4102, Part 2, 6.2.10) or a shock pressure of 20 N/m$^2$ ((DIN 4102, Part 2, 6.2.9)

The fiber-free boards of gas concrete and expanded vermiculite, they have a dimensional stability up to 1100 ° C., have a bulk density of from 600 to 1000 kg/m$^3$, due to the material and production process, however, in said range the coefficient of thermal conductivity of from 0.1 to 0.3 W/m K is still very unfavourable.

The following Table 1 provides a survey of the organic and inorganic foam insulating bodies as presently known in the art:

TABLE 1

|  | Bulk Density kg/m$^3$ | Coefficient of Thermal Conductivity W/m K | Limit of Temperature Stability[*] |
|---|---|---|---|
| Polystyrene foam (melt off; fume and gas formation) | 15–35 | 0.035 | 80° C. |
| polyurethane foam (fume and gas formation) | 30–50 | 0.030 | 130° C. |
| PVC foam | 30–50 | 0.035–0.040 | 150° C. |
| Amino- and Phenoplast foam | 15–50 | 0.035–0.040 | 120–140° C. |
| Glass wool, form of mats and boards | 30–200 | 0.035–0.050 | 500° C. |
| Mineral wool, form of mats and boards | 30–400 | 0.035–0.060 | 750° C. |
| Glass foam | 135 | 0.045 | 460° C. |
| Gas concrete | 600–900 | 0.1–0.2 | 1100° C. and higher |
| Expanded verticulite | 700–900 | 0.1–0.3 | 1100° C. and higher |
| Expanded perlite | 700–900 | 0.1–0.3 | 800° C. |

[*]Long-term resistance from 180 to 360 minutes according to DIN 4102 Upon short-time heating (for some minutes), higher temperatures may often be employed.

From the above Table it will be apparent, inter alia, that thermal stability higher than 800° C. can be achieved only with materials that have markedly poor coefficients of thermal conductivity.

With respect to thermal resistance at higher temperatures, a Standard Temperature-Time Curve (ETK) in accordance with the Standard of DIN 4102 has been internationally accepted. Said curve represents the volume stabilities of building materials in case of fire as follows:

| after | 30 minutes (t-min) | 822 K |
| | 60 minutes | 925 K |
| | 90 minutes | 986 K |
| | 120 minutes | 1,029 K |
| | 180 minutes | 1,090 K |
| | 360 minutes | 1,194 K |

Thus, there is a true demand for a material which has a bulk density within a range of from 50 to 500 kg/m$^3$, has a coefficient of the thermal conductivity within the range of from 0.035 to 0.055 W/m K and is absolutely fire-proof and volume-stable at temperatures up to 1200° C.

It is known that air and gases are the best heat-insulating materials. Part of the thermal conduction in air and gases is by way of circulation. Only if the pore volumes will become relatively small to have diameters of 2 mm and less, will the air circulation become so low that physically it may be neglected.

Thus, it was the object of the present invention to find an insulating foam material and a process for producing same in order to fill the following gap: A coefficient of the thermal conductivity which is as low as possible in order to keep the heat of fire away from the body to be protected, e.g. load-bearing steel supports the critical temperature which is about 500° C., and in combination therewith to attain a high mechanical strength in the temperature range up to 1200° C.

It was a further object of the invention that said mechanical strength should be retained over the range of a beneficial impact and compression strength (DIN 4102, Part 2, 6.2.9 and 6.2.10) and the desired foam body at the same time should have high values of flexural strength, surface abrasion resistance, tensile and shear strength, notched impact resistance and, in addition, highest gas and vapor diffusion barrier properties, water resistance, resistance to UV irradiation and resistance to mildew formation and bacteria. Thus, more specifically, it was the object to develop an inorganic foam body which at least in part comprises open cells, is easy to produce and is dimensionally stable at very high temperatures.

It was now found that this object can be attained in a surprisingly simple manner by providing that the inorganic foam body, consisting of an at least partially open-cell foam formed by thermally foaming and hardening a mixture comprising an alkali water glass and a filler from the group of aluminium oxide, silicon dioxide, aluminous cement, crushed rocks, graphite and mixtures thereof has a bulk density of from 50 to 500 kg/m$^3$, and preferably from 50 to 400 kg/m$^3$. As the foaming agents there may especially be used highly efficient organic foaming agents such as azodicarbonamide. Said foaming agent so far has been exclusively used for foaming organic synthetic resins. Inorganic foam bodies, such as foamed concrete, so far have been produced either by making a stable foam hydraulically set from cement, water and a detergent or by adding aluminum powder to a mixture of water and cement which due to gas evolution resulted in foaming-up the concrete prior to the setting thereof. Nevertheless, both methods only lead to products which still had relatively high bulk densities and, hence, relatively high coefficients of thermal conductivity. In the production of foamed glass, predominantly inorganic gas-forming agents or steam were used for foaming. The involved processes have proven to be technically relatively expensive. The foamed glasses constitute a costly compromise with respect to the heat insulation property and fire-proofness, so that they largely failed to reach the technical importance expected. Moreover, said materials suffer from the drawback that they are only producible to have closed pores.

Foamed water glass with regared to its thermal properties is even inferior to foamed glasses. In addition, there is its absolutely non-existent stability to water. Therefore, initially it was not to be expected that a mixture comprising water glass and the fillers according to the invention upon foaming would result in the formation of inorganic foam bodies which have excellent properties. Under this aspect it was further to be noted that the inorganic foamed used so far had produced absolutely unsatisfactory results when employed with such mixtures. Surprisingly, in the first place organic foaming agents such as azodicarbonamide are excellently suitable to expand mixtures comprising water glass and the fillers used according to the invention and to convert said mixtures into foam bodies of the desired quality.

Unexpectedly, the resistance to water and to water vapour of the foam body according to the invention is excellent. This is due to the fact that the fillers according to the invention are capable of reacting with the water glass, at least superficially, at the foaming temperatures, thereby converting the water- and steam-sensitive water glass into water-insensitive silicates. These chemical reactions mainly take place with aluminum oxide and silicon dioxide and with fillers containing a sufficient proportion thereof. Graphite, although when used as the only filler it leads to less water-resistant foam bodies, if mixed with the other fillers exhibits excellent properties with respect to heat insulation and fire-protection. First it appeared amazing that the per se combustible graphite nevertheless produces good fire-proofness values in the foam bodies according to the invention. This is probably due to the fact that the surface of the graphite is coated with a vitreous layer of sodium silicate inhibiting the oxidation by oxygen.

What is of crucial importance in the manufacture of the foam bodies according to the invention is the mode of action and the efficiency of the foaming agent. All of the inorganic foaming agents known so far such as sodium bicarbonate, ammonium bicarbonate or peroxides are not capable of expanding mixtures comprising water glass and fillers to an extent such that raw densities of below 500 kg/m$^3$ are obtained. Accordingly, the coefficients of thermal conductivity of the obtained products are distinctly inferior. Thus, for the first time it was successfully accomplished by using an organic foaming agent such as azodicarbonamide, to expand mixtures comprising water glass and fillers to to such an extent, and to stabilize the obtained foam, that products having the desired properties could be formed. It should be noted that azodicarbonamide is decomposed sufficiently fast at from about 170° C. Therefore, the process according to the operation may be carried out already at temperatures in excess of 180° C. Particularly good results are obtained, once the mixture is heated at temperatures of between 200° C. and 300° C. whereupon uniformly fluffy partially open-celled products are formed. Depending on the ratio of amounts of water glass:filler, on the one hand, and the addition of the blowing agent, on the other hand, it is possible to produce bulk densities of from 50 to 500 kg/m$^3$, and preferably from 50 to 400 kg/m$^3$. It is of course also possible to produce foam bodies having higher bulk densities, however, this operation would not necessarily require the process according to the invention.

Inorganic media such as glass, porcelain and ceramic fired products are known to be incapable of being elasticized. Foam materials having thin walls of 0.001 to 0.0001 mm in thickness, due to their nature, must be mechanically sensitive because they are brittle. Only cell walls of synthetic materials are elastic. However, inorganic foam bodies are to have a minimum stability for the steps of production, transportation and mounting, particularly in civil engineering. For this reason, processes and embodiments of the present invention have further been developed which also meet these requirements. To this end, the foam bodies according to the invention having a bulk density of from 50 to 500 kg/m$^3$, and preferably from 50 to 400 kg/m$^3$, are impregnated only in the border zones with a mixture comprising alkali water glass and inorganic fillers such as aluminum oxide, quartz meal and the like. In practice this may be effected by spraying or immersing the body to a desired depth followed by drying at temperatures in excess of 100° C. More specifically, the open-cell structure is necessary for this kind of after-treatment. According to the invention, the low bulk density desired for a beneficial heat insulation is retained in the largest portion of the foam body, while the mechanically stressed border zone is provided with a higher mechanical stability. In the case that the foam body has larger dimensions, this border line reinforcement may be improved by carrying out two successive impregnation operations, with first employing a mixture which has a lower viscosity, and then in the second step using a mixture which has a higher viscosity.

In this process stage, the foam bodies according to the invention do already have some minimum stability, however, they are still permeable to gas and steam. The values are between 5 and 50 μm. In some practical cases such natural breathability after a structural incorporation is desirable, however, such a water and steam absorbability is mostly infavorable because a drenched insulating body has a substantially elevated thermal conductivity corresponding to a less desirable reduced heat insulation. Water has a coefficient of thermal conductivity of 0.58 W/m K, and the coefficient of thermal conductivity of ice is even 2.2 W/m K. Furthermore, the freezing of water in a porous heat-insulating body causes a dangerous disintegrative effect to occur.

In these particular cases, any penetration of water must in any event be prevented. To this end a compact layer consisting of a pastous mixture comprising an alkali water glass and an inorganic filler may be applied by spraying or by knife-coating, followed by drying as in the preceding impregnations. However, the durability of these external cover layers is accomplished only by the method of reinforcing the border zone, since thereby said cover layer is statically anchored in the depth of the body. Otherwise said layer would not be strongly bonded and would readily be delaminated. The depth bonding is preferably effected by way of the same adhesive bonding material of the alkali water glass, so that no alien adhesive medium will be needed. If it is further intended to reinforce said layer so that it will be diffusion-tight, an aluminum foil, for example, of a thickness of, e.g., 0.05 mm may be applied thereonto, wherefor alkali water glass again is a suitable adhesive medium for said metal foil. If it would be desired or required, such aluminum foil may in turn be coated with a layer of the above-mentioned pasty mixture.

The aluminum foil additionally has a fortunately considerable tensile strength. Since in practice some flexural strength is often urgently needed—as has been mentioned above—and the risk of breakage actually must have been removed, further versions were tested which surprisingly exhibited an excellent result.

Fine steel wire cloth (gauze) was incorporated in the border zones already during the process of expanding the inorganic media to form the foam body. Due to the gauze structure, no inhibition of the expansion occurs. Thereby the gauze have been positioned in the appropriate zones where the flexural strength is needed in the composite bodies. This is explained in detail by FIG. 1. The term composite body of two media is known to be understood to mean that said two media attain the desired effect only after they have been combined to form the composite structure. This is subject to the condition, among others, that the composite structure will be retained upon static stress. According to the invention, this is the case, because the adhesive effect is very high and at higher temperatures is also retained, since the coefficients of thermal expansion of the two media—inorganic matter and steel—fortunately are nearly identical.

Furthermore, a tensile reinforcement may be additionally or exclusively inserted in the compact cover layer, with the same adhesive effect between the two media. As this adhesive effect will possibly also occur between water glass as a heat-stable adhesive and other media, glass fiber cloth, glass rovings, cellulose products such as soda kraft paper or water-glass impregnated cardboard, puched metal foils or sheets having round or square holes may be employed, if the open area (hole) portion is between 50 and 80%.

In all of these cases, composite materials having highly interesting properties are formed, because the interior thereof comprises the very good heat insulation and the very high thermal resistance to the very high fire temperatures, whereas the external inorganic zones provide the required mechanical properties of high compression, flexural and shear strengths and, if desired, layers which are absolutely water-proof and gas-steam diffusion-tight. The sudden impact by a high-pressure water-jet onto these foam bodies, e.g. when forming a casing around steel supports in sky scrapers, cannot deteriorate the stability in shape even at very high fire temperatures.

Thus, the foam insulating bodies according to the invention may be modified in various ways as composite foam bodies and may be combined with other materials, depending on the intended final use. Thus, the bodies according to the invention may be dyed as desired.

Figure 2:
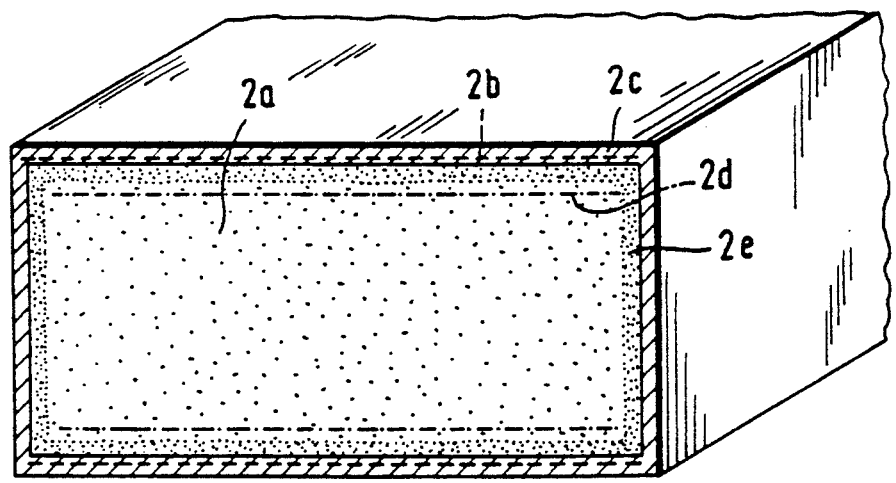

In view of the adhesive property inherent to the above-described mixture, the process may be carried out such as to produce foam bodies having the low bulk density of from 100 to 200 kg/m$^3$ as well as foam bodies having bulk densities of from 300 to 400 kg/m$^3$ and finally solid compact boards comprising tensile reinforcement elements, all of which are then bonded to one another by adhesion bonding. This mode of operation is shown in FIG. 2.

It is just the protective function of the casings around steel beams and steel supports in steel structures, especially in sky scrapers, that in case of fire is of greatest importance for the safety of persons and material. Due to the frequently occurring overload of such buildings with power supply cables, on the one hand, and with flammable materials due to the outfit with plastics etc., on the other hand, it must always be expected that they may catch fire.

Although the external appearance and the scratch resistance (the hardness according to the Mohs' scale is from 8 to 9) of the topmost inorganic optionally dyed cover layer is absolutely sufficient, said layer may be coated with glazes as well as provided with plywood or marble etc. panellings.

Thus, the foam bodies according to the invention may not only be modified in various ways combined with other materials, depending on the intended final use, but they may also be adapted to the intended subsequent use by introducing the foamable composition to a desired mold in the foaming process. Furthermore, the foam body, due to its fine-celled uniform brittle cell structure may be readily milled, holed and ground. The shaped products made thereby are distinguished by a high precision, a high inner stability—the thin glue joints have a strength which is substantially higher than that of the porous bodies—and by an according variety of possible uses, e.g. in machine building and apparatus manufacturing, where high standards are set for the volume stability in temperature ranges of up to 1200° C. Moreover, such complicated molded bodies may be very economically produced in smaller or larger batch-quantities at a relatively low expense in molding forms or shells and in operation time.

The usable alkali water glasses are the commercially available products. Sodium water glass of grade 38 Beaumé is preferably used. Sodium silicate solutions of higher concentrations will become too viscous, especially due to the contents of filler. In the case of a dilution to less than 20 Beaumé the amount of water that must be evaporated is unnecessarily high without being of any use to the stability of the product.

The filler content may be varied within relatively wide limits. Ratios of amounts of from 1:1 to 1:5 are preferred to be used.

As the aluminum oxides there may be employed commercially available products which are more or less pure. It is even possible to employ red mud which consists of aluminum oxide contaminated with significant amounts of iron hydroxide. It has been shown that also admixtures of alumina with red mud, quartz meal and aluminous cement exhibit very beneficial properties. For example, the compressive strength increases upon mixing quartz meals of various grain sizes.

Finely ground quartz sand may be employed as $SiO_2$, and so may be more or less pure precipitated silicic acids.

Aluminous cement contains aluminum oxide as well as $SiO_2$ and may be readily used according to the invention. As the crushed rocks there may be employed particularly those containing a sufficient amount of $SiO_2$ and/or aluminum oxide. The usable graphite includes the commercially available grades, while hydrophilic grades are easier to process than hydrophobic ones. The layer structure of graphite renders it particularly well suitable for products having bulk densities of from 70 to 100 kg/m$^3$ as well as one component of filler mixes.

The amount of organic blowing agents such as azodicarbonamide again may be varied within wide limits, while in the first place it will depend on the desired degree of foaming. Amounts of from 5 to 15% by weight of the batch have proven to work well. In any event they comprise enough expanding force such as to expand the mixtures of water glass and filler to the desired extent upon heating. The expansion is effected by heating to temperatures at which, on the one hand, the azodicarbonamide will be decomposed sufficiently fast while, on the other hand, the mixture of water glass and filler is still deformable. Preferably, the expansion is effected at between 200° C. and 300° C.

In a preferred embodiment, air volumes of appropriate dimensions are included in the inorganic foam body, e.g. in the form of air channels.

Figure 4:
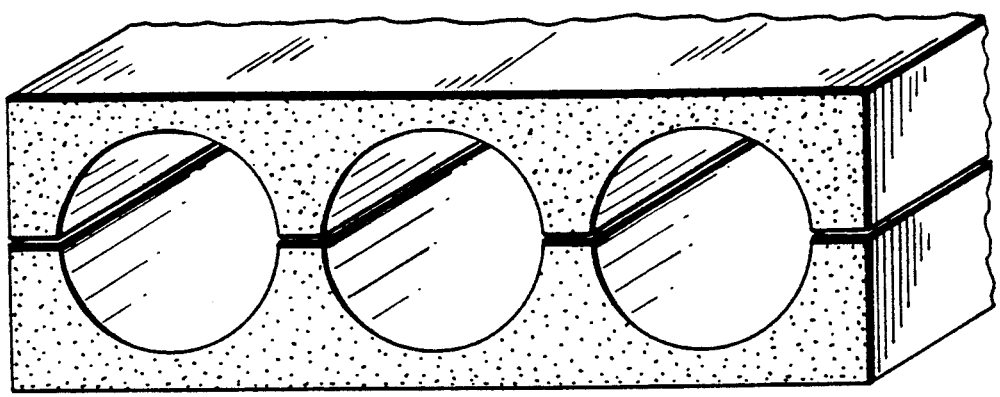

The result of the inclusion of air channels in the foam body according to the invention is shown in FIG. 4. Here, it is important that the required inherent stability and flexural strength of the body will not be reduced by the channels. On the contrary, due to the reduction of the net weight by more than 50%, the flexural strength is even considerably increased, and the body has improved properties for transportation and handling.

Figure 5:
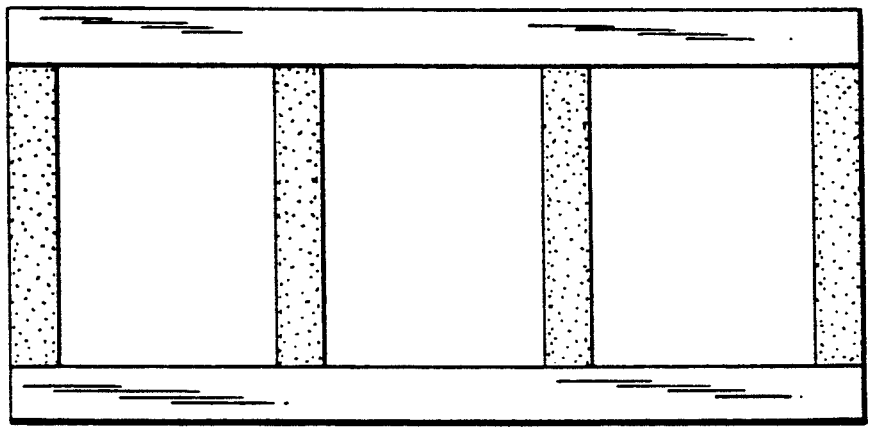

FIG. 5 schematically shows the testing procedure according to the so-called board test procedure corresponding to the DIN Standard, and it is seen as the result that the bridges of the foam body comprise a proportion by volume of, e.g., from 15 to 20%, and here the coefficient of thermal conductivity is 0.043 W/m K, whereas in the air volumes of from 80 to 85% the coefficient only amounts to 0.023 W/m K. Thereby the final coefficient of thermal conductivity of this inorganic insulating material is significantly lowered to from 0.028 to 0.030 W/m K.

For comparison, such an insulation value is achieved by the polystyrene foam boards in particle form or extruder form as available in the market of insulating materials, which boards are considered as an excellent material with respect to its insulating value—however not with respect to its behavior at temperatures above 100° C.

Attention has to be drawn to the fact that the inorganic liquid composition in accordance with the respective formulations with the incorporated azodicarbonamide blowing agent, upon temperature increase above room temperature, exhibits the tendency of being spherically expanded due to the evolution of the gaseous ammonia. However, in the practical use of insulating materials in building construction for insulating walls there are used board-shaped insulating materials rather than spherical ones. If a mold is placed in the heating oven with edge uppermost (vertically) and the liquid composition to be expanded is introduced on the bottom of said mold, then it is observed that the spherical extension of the ammonia gas is nearly completely prevented by the lateral high walls. The result is a composition which has been by far too little expanded and has much too high a bulk density. If, on the other hand, a board mold was placed so as to rest on its lateral surface of, e.g., 500 mm in length, then, although the foam body upon the action of the blowing agent developed such as to have the low bulk weight of from, e.g., 100 to 300 kg/m$^3$, it was of planar shape on its bottom surface but always of convex shape on its top surface because of the spherical expansion. Therefore, the upper portion of the product had to be removed by a saw-cut in order to obtain the board shape. This of course constitutes a loss, even if said waste material can be recycled and used again.

Figure 3:
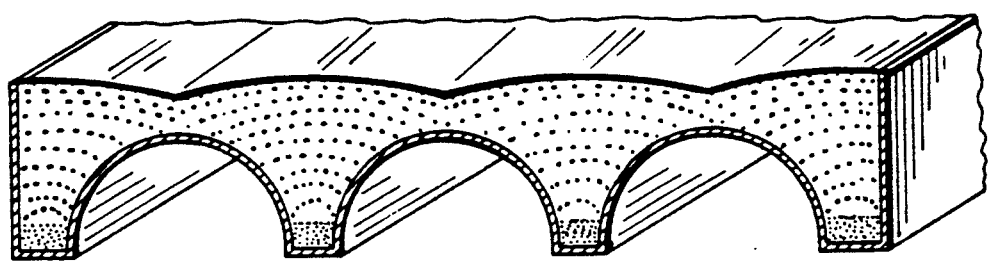
Figure 6:
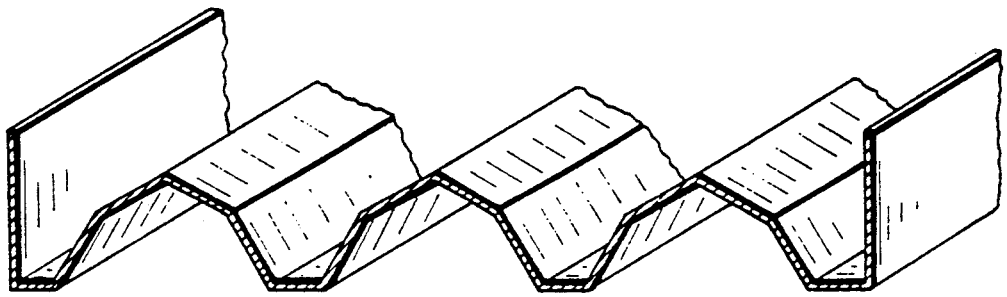

The molds shown in FIG. 3 and, in modified form, in FIG. 6, when used as bases for the composition to be expanded, significantly counteract effect of the spherically directed expansion as shown by the curved dotted lines. Thus, the spherical expansion, in a way, is broken into many small spherical shapes comprising only very small convex elevations that may be readily levelled by a saw-cut.

By means of this variant of the inorganic foam board, thus, several advantages are achieved altogether:

Significantly lower coefficient of thermal conductivity,
lower material consumption,
lower transportation weight,
more advantageous shape for removing the last residual amounts of water after foaming,
higher flexural rigidity,
easier process technology of expanding and, thereby, lesser material losses in shaping a board.

An insulating material board according to FIG. 3 in practice would be suitable to cover power cables and to protect same from cable fires and other fires.

Since the formulation comprising liquid sodium silicate and inorganic powder meals itself constitutes an adhesive medium, joining as shown in FIG. 4 is particularly easy. Thereupon it was determined that the thin solid joint, when subjected to tensile stress, is more durable than the foam.

Figure 7:
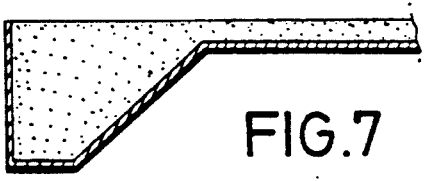

Furthermore, in FIG. 7 it is shown that it is expedient in the production of such air channels that these are sealed on both ends, so that foreign air cannot get into the air channels in the board according to FIG. 4 and thereby deteriorate the coefficient of thermal conductivity.

Hereinbelow still another method is described in order to decrease the proportion of air in the final inorganic insulating board and thereby to increase the insulating effect. This is accomplished by the use as filler of bodies made of foamed synthetic resins.

It is also particularly preferred to incorporate short pieces of glass and fiber having a length of preferably from 5 to 50 mm in the foam body.

Plastic resin foam bodies are known to be used in large amounts as packaging material, for example polystyrene particle foam parts as integral bodies or in the form of chips. In view of the goals of reducing environmental pollution—matter is known hardly to rot in dumping grounds—and of recycling matter in general, all these particles of foamed material, once crushed in suitable machines, can be incorporated in the bodies according to the invention.

If said waste products made of synthetic resin foam are to be used as fillers, the following process steps expediently are to be employed.

The molded parts made of said materials and having the low bulk densities of from 15 to 40 kg/m$^3$ are size-reduced to flakes or schedules having a diameter of from 1 to 10 mm and higher, and the obtained granular materials are uniformly sprayed on all sides with a water glass mist and dried in an oven. The resulting very thin surface film enables portions of water from the expanding composition to penetrate into the granular material after mixing and further in the blowing process, due to the adhesive action of said film, an even better bonding to the expanding composition is achieved which considerably contributes to an enhancement of the inner strength.

The addition of these waste particles is effected with thorough mixing, so that the particles will be uniformly distributed. The proportion of waste particles relative to the total volume may be up to 50% and even more. The percentage substantially depends on the degree of uniformity of the waste particles, the shapes thereof which are preferred to be round, and the bulk density thereof.

If, for example, said proportion is 50%, then a significant reduction in the bulk density of the foam bodies is to be expected. Thus, upon the addition of 50% by volume of waste particles having a bulk density of 20 kg/m$^3$ to a foam body having a bulk density 200 kg/m$^3$, the bulk density of the obtained product will be decreased to 110 kg/m$^3$. Even this bulk density, may be still reduced at a proportion of from 50 to 70%, so that a coefficient of thermal conductivity of 0.032 may be attained.

In building construction there will also accrue remainders of glass and rock fiber mats. In order to avoid waste disposal thereof, they are cut to shorter lengths of, e.g., from 10 to 50 mm, and are well admixed with the expanding composition in the same manner as described for the waste foam particles. It has been shown that such an enrichment with uniformly distributed inorganic fibers causes the inner strength of the final inorganic foam body to significantly increase and any crack formation after drying to be absolutely prevented. The adhesion of these glass and rock fibers to the water glass is particularly advantageous as a tensile reinforcement in the structure altogether.

Now, after the inorganic insulation body thus produced is subjected to a fire test with temperatures up to 1200° C., it was surprisingly determined that upon incorporation of the artificial foam particles no deterioration does occur with respect to the volume stability of the foam body at these high temperatures. If the inorganic foam body produced as according to the invention is coated with a solid inorganic layer which is from 0.5 to 20 mm in thickness and gas diffusion-tight, no oxygen can approach the particles of the synthetic material at temperatures between 100° C. and 1200° C. These particles will disappear at temperatures in excess of 100° C. to leave air cells corresponding to their volumes. Since at high temperatures in excess of 500° C. the inorganic foam mass anyway will rather become harder, no deterioration can occur in the inorganic foam body at such fire temperatures.

Explanations of the FIGS. 1 through 7:

FIG. 1 A foam body 1a having a bulk density of about 120 kg/m$^3$ in its interior, 1b border zone reinforced by impregnation, bulk density of about 300 kg/m$^3$, 1c compact scratch-resistant and diffusion-tight cover layer.

FIG. 2 A foam body 2a having a bulk density of about 120 kg/m$^3$ in its interior, 2b tensile reinforcement incorporated as insert, 2c compact scratch-resistant and diffusion-tight cover layer, 2d tensile-reinforcing steel wire gauze incorporated as insert, 2e border zone reinforced by impregnation, bulk density of about 300 kg/m$^3$.

FIGS. 3, 4 and 6 show foam bodies according to the invention which comprise air channels in various embodiments (semicylindrical, cylindrical and angular air channels).

FIG. 5 schematically represents the test procedure according to DIN of the board test method.

FIG. 7 shows that the air channels at both ends thereof are sealed off from environment so that foreign air cannot enter.

Typical embodiments of the process according to the invention and the products obtained thereby are illustrated by way of the following Examples.

EXAMPLE 1

1000 g of sodium or potassium water glass of 38 Beaumé,
700 g of fine-grain quartz meal and
77 g of azodicarbonamide
are thoroughly mixed with each other. This viscous composition is introduced into an oven kept at +220° C. After about 20 minutes, the composition has expanded to about 10 times its volume. The surface of the obtained mass has a continuous casting skin. Once the mass has been cooled, geometrically shaped bodies may be readily sawed out therefrom. The water content in the sodium silicate is still 20 to 25% by weight. This residual water may be removed by subsequent drying at temperatures even below 100° C. The density of the dried product is 190 kg/m$^3$, and its coefficient of thermal conductivity is 0.054 W/m K. No deformation occurs upon a temperature stress of 1200° C. On the contrary, the mechanical strength is even enhanced by such heating. Also no smoke is formed upon heating at these temperatures.

EXAMPLE 2

1000 g of sodium silicate of 38 Beaumé,
700 g of aluminous cement and
100 g of azodicarbonamide
are intimately mixed, and the obtained mixture is applied onto a tray having a Teflon surface. The tray is placed in an oven of 220° C. After 20 minutes the mass has been expanded, and the cast skin is relatively tight. After cooling, shaped bodies are sawed out and weighed. The bulk density is 160 kg/m$^3$. After a drying operation at less than 100° C. the bulk density has been decreased to 125 kg/m$^3$. The coefficient of thermal conductivity is 0.046 W/m K. The stressability by heat is the same as that of the material of Example 1.

EXAMPLE 3

1000 g of sodium silicate of 38 Beaumé, are intimately mixed with
700 g of graphite and
120 g of azodicarbonamide
and the mixture is placed in an oven of 220° C. After 20 minutes the mass has been expanded. The shaped bodies obtained by sawing-out have a bulk density of 120 kg/m$^3$. After a drying operation the density is only 95 kg/m$^3$. The coefficient of thermal conductivity is 0.039 W/m K. The stressability by heat is the same as that of the material of Example 1.

EXAMPLE 4

1000 g of sodium silicate of 38 Beaumé,
850 g of aluminum oxide and
100 g of azodicarbonamide
are mixed and treated at 220° C. as described above. The sawed-out shaped bodies have a bulk density of 200 kg/m$^3$ and are white like porcelain. After drying the density is 155 kg/m$^3$. The coefficient of thermal conductivity is 0.049 W/m K, and the compressive strength is very high.

The Example was repeated using red mud in the place of aluminum oxide. Hereby a similar product is formed which is brick-red in color.

EXAMPLE 5

The foam body according to Example 1 was immersed in a suspension comprising
1000 g of sodium silicate of 38 Beaumé and
250 g of aluminum oxide.

Upon immersion, this suspension will only penetrate into the border zones to a depth of from 3 to 6 mm. The body was dried at 90° C. Then it was il turn immersed in a concentrated suspension comprising
1000 g of sodium silicate of 38 Beaumé and
500 g of aluminum oxide which penetrated to a depth of only 2 mm and dried again. Upon heating at 200° C., a product having substantially higher strength in the outermost layers was obtained. The strength was even increased after heating the product at 800° C.

Part of the obtained specimen was coated with a suspension comprising
1000 g of sodium silicate and
900 g of aluminum oxide
to a thickness of the coating of 1 mm and then dried again and baked at 800° C. A product was obtained which exhibited a continuous skin and had a hardness of from 8 to 9 on the Mohs scale of hardness.

What is claimed is:

1. An inorganic foam body comprising an at least partially open-cell foam formed by thermally foaming and hardening a mixture comprising azodiacarbonamide as a foaming agent in amounts from about 5 to 15% by weight, an alkali water glass and a filler in a ratio of from about 1:1 to 1:5 by weight of filler to glass, wherein said glass and filler are selected from the group consisting of aluminum oxide, silicon dioxide, aluminous cement, crushed rocks, graphite and mixtures thereof, wherein said foam body has a bulk density within the range of from about 50 to about 500 kg/m$^2$, and a coefficient of thermal conductivity within the range of from 0.035 to 0.055 W/kM and a thermal (dimensional) stability of up to 1200° C.

2. The foam body according to claim 1, wherein the bulk density is from about 50 to 400 kg/m$^3$.

3. The foam body according to claim 1, wherein the outer layers have been impregnated with an unfoamed mixture comprising an alkali water glass and a filler and have been dried at a temperature in excess of 180° C.

4. The foam body according to claim 1, wherein at least one of the surfaces has been provided with a solid diffusion-tight layer.

5. The foam body according to claim 1, wherein at least one of the surfaces has been bonded to a reinforcing layer tensile reinforcing insert.

6. The foam body according to claim 1, wherein air channels are disposed in the foam body.

7. The foam body according to claim 1, wherein as a filler there if used a crushed synthetic foam which in advance has been sprayed from all sides with a water glass mist and dried in an oven at a temperature above 100° C.

8. The foam body according to claim 1, which further comprises glass and crushed stone as a filler.

9. The foam body according to claim 5, wherein the tensile reinforcing insert is selected from the group consisting of glass fiber cloth, glass roving, soda kraft paper, water glass-impregnated cardboard, and puched metal having round or square holes provided that the holes comprise between 50 and 80% of the total area of metal.

* * * * *